United States Patent [19]
Gleason et al.

[11] 3,766,001
[45] Oct. 16, 1973

[54] RECLAIMING PULP FROM WASTE PAPERS BY TREATING WITH A SOLUTION OF SODIUM HYDROXIDE, SODIUM CARBONATE, SODIUM OR AMMONIUM BICARBONATE, AND SODIUM BORATE

[75] Inventors: C. Roy Gleason, Chicago; Gordon A. Thomas, Wilmette, both of Ill.

[73] Assignee: World-Wide Paper Reclamation, Inc., Chicago, Ill.

[22] Filed: Aug. 17, 1971

[21] Appl. No.: 172,600

[52] U.S. Cl............................ 162/8, 162/4, 423/277
[51] Int. Cl......... D21b 1/08, D21b 1/32, D21c 5/02
[58] Field of Search............................ 162/8, 4, 90; 423/277, 279, 286

[56] References Cited
UNITED STATES PATENTS
3,620,909   11/1971   Gleason ................................. 162/8
2,013,841   9/1935    Richter ............................... 162/8 X
1,988,363   1/1935    Snyder................................. 162/8 X
1,060,158   4/1913    Burby .................................... 162/8

Primary Examiner—S. Leon Bashore
Assistant Examiner—Richard H. Tushin
Attorney—McDougall, Hersh & Scott

[57] ABSTRACT

The reclamation of purified and reusable pulps from various types of waste papers by first shredding the paper into fine pieces, boiling the shredded paper in a chemical solution containing an alkali metal hydroxide, an alkali metal carbonate an alkali metal bicarbonate and sodium borate, water washing the chemicals from the cooked paper and then bleaching the pulp with a chemical bleach at elevated temperature. The chemicals in the solution are believed to react to form sodium borocarbonate as a reactive compound.

18 Claims, No Drawings

RECLAIMING PULP FROM WASTE PAPERS BY TREATING WITH A SOLUTION OF SODIUM HYDROXIDE, SODIUM CARBONATE, SODIUM OR AMMONIUM BICARBONATE, AND SODIUM BORATE

This invention relates to the reclamation of purified and reusable pulp from paper which may be in the form of clay coated paper, printed paper, or paperboard, envelopes, magazines and trade papers and bond and ledger papers, printed, embossed or lined with various types of colored printing inks, magazine cover sheets, book paper, binders and the like.

Difficulty has been experienced in removing certain resinous or hot melt types of adhesives, color of papers, such as golden rods, canaries in bonds and ledgers, and various types of inks used in the printing, book publishing, magazine publication and the like, and some papers embodying large quantities of valuable fibers of even rag or cotton content. Rotogravure, offset, high gloss inks along with letter press inks of innumerable resin contents and colors that have to be removed, present additional problems. Many such paper wastes are being burned by thousands of tons a day and this despite inevitable paper shortages facing the industry.

It is most desirable to be able to reclaim the fibrous content of such waste papers for reuse in the making or upgrading of quality paper and paperboard stocks for cartons and packaging. For such purposes, and as an object of this inventionk it is desirable to provide a simple, economical and efficient process for the removal of sizings, or binder, or various resins and other color material present in the printing inks, coating resins, binder adhesives and the like, with a view towards yielding a clean white or colorless pulp which can be used to produce quality pulp in the manufacture and upgrading of news paper, printing paper, paperboard, envelopes, bags and other paper or cellulosic products.

The invention will hereinafter be described with special reference to the reclamation of waste papers as derived from clay coated cover sheets and magazines, trade papers, etc. which have been printed with a wide variety of differently colored printing inks and sheets taken from the covers or bodies of magazines printed with various black and colored printing inks. Such printing inks are characterized by a high resinous content and pigments formed of carbon black, dyestuffs and the like. It will be understood that the hereinafter described process for reclamation of such printed magazine papers can be even more readily adapted to the reclamation of other types of papers printed or colored with various types of printing inks or unprinted or uncolored paper or paperboard.

EXAMPLE 1

A definite weight of printed magazines, etc. to be recovered, from cover to cover with no pages removed or without removal of any of its inserts, is chopped or shredded while the waste paper is preferably dry. If certain large equipment is available, the magazines can be run in their entirety without cutting or without shredding.

The cut up paper is weighed, as to volume to be processed, and then introduced into tanks for boiling with water, preferably in the ratio of 2 gallons of water per one pound of paper, with chemicals added to the water, as hereinafter described. Boiling with agitation is carried out for at least 10 minutes per batch.

Cooking composition with water:
For 1 pound of chemicals
100 grams sodium hydroxide (caustic soda) dry weight
250 grams sodium carbonate (soda ash)
48 grams sodium or ammonium bicarbonate
56 grams sodium borate (Borax)

One pound of the chemical mixture is used per 10–20 pounds of paper. This corresponds to 100–200 pounds of chemicals per ton of paper with the chemicals dissolved in water in the described ratio of 2 gallons of the aqueous solution per pound of paper. The chemicals are believed to react synergistically in solution to form sodium borocarbonate as a reactive compound.

It is desirable to cook at boiling temperature for at least 10 minutes with vigorous agitation during the entire time but short of reduction of the material to a pasty pulp. Lower temperatures down to 180° F. can be used but this markedly increases the reaction time in the chemical solution so that, for practical purposes, it is desirable to make use of temperatures above 200° F. to the boiling point temperature of 212° F. for the solution. This produces a pulp that requires the addition of water to enable the mixture to be pumped or drained from the cooking vessel. The pulp is drained and then washed with cold water.

In the process of this invention use can be made of tanks or equipment formed of steel and, for batch operation, it is desirable to operate with batches of 2000 to 4000 pounds of paper.

The boiled paper is pulped with cold water in a conventional Hydropulper, Holland or Jordan mill , or a beater until it reaches a pulp stage and is again cold water washed and screened.

The washed pulp is drained and then taken up with hot water at a temperature within the range of 110°–140° F. and a conventional chlorine type bleach, such as sodium hypochlorite, 5.25 active ingredient and 94.75 inert, is added in the amount up to 95 gallons per ton by weight of original paper. After bleaching for from 5–20 and preferably 10–15 minutes, the pulp is again washed in cold water for removal of the chlorine bleach solution. Thereafter the pulp is ready to form into wet laps or briquetted for use in equipment for the manufacture of paper or paperboard stock, etc. The wet laps can be shipped to near by paper mills without the necessity for drying or excessive rehydrolyzation thereby to save time while avoiding over-beating or deterioration of the pulp fibers or shortening of the pulp fibers. The briquettes can be quickly rebeaten for pulp formation.

Recovery of the fibrous component of the original waste papers varies in their yields as to the kind and classification of the waste used. The fiber that is recovered is free of inks, clay coatings, adhesives, fillers and sizing of the type originally present in the waste paper stock and is thoroughly antiseptic and free of slimicides and fungicides. Also, germs and bacteria are killed in the chmical boiling and treatment so that the end product is relatively pure and safe for further reuse. The pulp fibers can be used alone or in combination with other pulps or with rag or cotton containing pulp for use in the manufacture of fine white papers or bonds or ledgers. Kraft paper can be reclaimed from bags, envelopes, printing papers, paperboard, carton stock or the like in high yields. According to the class of paper recovered, the pulp can be used in controlled mixtures and percentages that can be standardized to meet uniform specification. Recovery of bonds and ledgers and bleached Kraft are most desirous and give high yields of 80 percent and some 90 percent yield and offer greater demand and profit.

EXAMPLE 2

Cancelled and used bank checks and stock certificates, usually printed on yellow, green or blue safety paper in any proportion can be substituted for other high grade papers and processed, as in Example 1. The reclaimed pulp is pure white with better than 80 percent recovery.

EXAMPLE 3

25–50 percent rag or cotton content paper in the form of bond paper with engraved letterheads was processed in accordance with Example 1. Pads formed by filtering the reclaimed fiber showed highest recovery yields of the rag and cellulose fiber without noticeable deterioration in the fiber. White bond waste carries a premium and thus limits the available supply, but using all colored, or all mixed, greatly increases the tonnage available for reclamation in accordance with Example 1. These papers offer no problems when processed as in Example 1.

EXAMPLE 4

Large heavy envelopes of Kraft paper, with variously colored tags pasted on the surface and with cancelled postage stamps left on were processed in various amounts. Some were unbleached and left as natural Kraft and some were bleached to different stages on up to real white. The paper was treated as in Example 1, but with the original vigorous boiling cook lasting for 10 to 15 minutes and use was made of slightly longer bleaching.

A Kraft pulp was reclaimed having a slight yellowish tinge with a recovery yield of more than 80 percent of the fiber originally present in the envelopes. When processed a little longer in bleach, the yield was the same but the pulp was very white.

The process, as described in Examples 1–4, is subject to a number of variations.

In the chemical bath, in which the disintegrated paper is cooked, the sodium hydroxide can be substituted in whole or in part in Example 1 by other alkali metal hydroxides, such as potassium hydroxide. The sodium carbonate can be substituted in whole or in part with other alkali metal or ammonium carbonates in equivalent amounts, and the sodium or ammonium bicarbonate can be substituted in whole or in part with other alkali metal bicarbonates.

While it is preferred to make use of the chemical components of the solution in the ratio described in Example 1, variation of chemicals in the amount of 100–200 parts by weight of alkali metal hydroxide, 150–250 parts by weight of alkali metal carbonate, 48 ± 20 percent parts by weight of bicarbonate, and 56 ± 20 percent parts by weight of borate, or ± 20 percent of the ratio in Example 1 can be employed. The amount of chemical solids per pound of paper can vary within the range of one part by weight of chemical solids per 10–30 parts by weight of paper, the best results being secured in the ratio employed in Example 1 of one part by weight chemical solids per 10–20 parts by weight of paper. The solution can be formulated to contain the described amounts of chemicals in solution in the ratio of 20 gallons solution per 0.5 to 2 pounds of chemicals and preferably in the ratio of 20 gallons solution per 0.8 to 1.2 pounds by weight of chemicals.

The paper can be boiled in the chemical solution at pressures above atmospheric pressure with corresponding higher temperatures but it is undesirable to make use of such higher temperatures as might cause deterioration of the fibers. It is preferred to process the paper at atmospheric pressure at a temperature of about boiling point temperature for the solution for about 10 to 15 minutes and for longer periods of time at lower temperature but it is not desirable to make use of a cooking temperature of less than about 180° F. and preferably not less than 200° F.

Similarly, the chlorine bleach can be carried out at temperatures up to 140° F. to below the 110° F. of Example 1 but it is undesirable to make use of a temperature for bleaching much below 100° F., otherwise the desired bleach will take an excessively long period of time, or in additional stages, with the danger of subjecting the pulp fibers to deterioration and increased costs.

It will be apparent from the foregoing that we have provided a new and efficient process for the reclamation of waste papers whereby a high quality pulp fiber is secured which may be used in the conventional manner for the production of paper and paper products.

It will be understood that changes may be made in the formulation and conditions of oepration without departing from the spirit of the invention, especially as defined in the following claims.

We claim:

1. In a process for the recovery of pulp from waste paper comprising the steps of sorting, grading, classifying and reducing the paper into segments of small dimension, admixing the segmented paper in a solution containing as essential ingredients sodium hydroxide, sodium carbonate, sodium or ammonium bicarbonate, and sodium borate, in which such chemicals are present in amounts varying within the range of ± 20 percent of the ratio of 100 parts by weight of sodium hydroxide, 250 parts by weight of sodium carbonate, 48 parts by weight of sodium or ammonium bicarbonate, and 56 parts by weight sodium borate, with the chemical solids being present in the solution in an amount within the range of one part by weight dissolved chemical solids per 10–20 parts by weight of paper, heating the solution to boiling to cook the paper, separating the cooked paper from the cooking solution, washing the cooked paper with cold water, pulping the washed product, reacting the washed pulp with a chemical bleach at a temperature within the range of 100°–140°F and then washing the bleached pulp with cold water.

2. The process as claimed in claim 1 in which the treatment of the waste paper in the chemical solution is carried out with vigorous agitation.

3. In a process for the recovery of pulp from waste paper comprising the steps of reducing the paper into segments of smaller dimension, admixing the segmented paper in a solution containing as essential ingredients an alkali metal hydroxide, an alkali metal or ammonium carbonate, an alkali metal or ammonium bicarbonate and an alkali metal borate, in which such chemicals are present in the ratio of 100–200 parts by weight of alkali metal hydroxide, 150–250 parts by weight of alkali metal carbonate, 48 ± 20 percent parts by weight of the bicarbonate and 56 ± 20 percent parts by weight of the borate, with the chemical solids being present in the solution in an amount within the range of one part by weight dissolved chemical solids per 10–30 parts by weight of paper, heating the solution to boiling to cook the paper, separating the chemically treated paper from the solution, washing the paper with water, pulping the washed product, and reacting the washed pulp with a chemical bleach at a temperature within the range of 100°–140°F, and then washing the bleached pulp with water.

4. The process as claimed in claim 3 in which the dissolved chemical solids in the solution are present in the ratio of one part by weight chemical solids to 10–20 parts by weight paper.

5. The process as claimed in claim 3 in which the separated chemically treated paper is washed with cold water.

6. The process as claimed in claim 3 in which the bleached pulp is washed with cold water.

7. The process as claimed in claim 3 in which the paper is boiled in the cooking solution for at least 10 minutes at a temperature within the range of 180°–212° F.

8. The process as claimed in claim 3 in which the paper is boiled in the cooking solution for at least 10 minutes at a temperature above 200° F. up to the boiling point temperature for the solution.

9. The process as claimed in claim 3 in which the alkali metal hydroxide is sodium hydroxide and in which the bicarbonate is sodium bicarbonate.

10. The process as claimed in claim 9 in which the chemicals react synergistically to form sodium borocarbonate.

11. The process as claimed in claim 3 in which the alkali metal carbonate is sodium carbonate and in which the alkali metal borate is sodium borate.

12. The process as claimed in claim 3 in which the chemicals are present in the boiling solution in an amount per 20 pounds of paper of 100 ± 20 percent grams sodium hydroxide, 150 ± 20 percent grams sodium carbonate, 48 ± 20% grams sodium bicarbonate and 56 ± 10 percent grams sodium borate.

13. The process as claimed in claim 3 in which the boiled and washed paper is pulped with cold water in a Hydropulper or beater.

14. The process as claimed in claim 3 in which the pulp is bleached under vigorous agitation with a chemical bleach at a temperature within the range of 110°–140° F.

15. The process as claimed in claim 14 in which the bleach is carried out for a time within the range of 5-15 minutes.

16. The process as claimed in claim 3 in which the bleach is a chlorine bleach.

17. The process as claimed in claim 3 in which the materials are employed in the ratio of 0.5 to 2 pounds of chemicals per 20 gallons of solution and one pound of chemicals per 10–30 pounds of paper.

18. The process as claimed in claim 3 in which the materials are employed in the ratio of 0.8 to 1.2 pounds of chemicals per 20 gallons of aqueous solution and 10–20 pounds of paper.

* * * * *